United States Patent [19]

Burkes et al.

[11] 3,970,253

[45] July 20, 1976

[54] FLOW AREA MODULATOR AND FLOW DEFLECTOR

[75] Inventors: William M. Burkes; William H. Miller, both of McGregor, Tex.

[73] Assignee: Rockwell International Corporation, El Segundo, Calif.

[22] Filed: June 16, 1975

[21] Appl. No.: 587,022

Related U.S. Application Data

[62] Division of Ser. No. 395,807, Sept. 10, 1973, abandoned.

[52] U.S. Cl. ............................ 239/265.19; 239/506; 239/582; 181/33 HD; 138/45; 251/307
[51] Int. Cl.² ................. B63H 11/10; B64C 15/06; F16K 1/228
[58] Field of Search .................. 239/265.11, 265.13, 239/265.19, 581, 582; 181/33 HA, 33 HD; 138/46, 45; 251/305–307

[56] References Cited
UNITED STATES PATENTS

| | | |
|---|---|---|
| 1,706,020 | 3/1929 | Barfoed ............................ 239/451 |
| 2,577,657 | 12/1951 | Houk .................................... 138/45 |
| 2,882,993 | 4/1959 | Murty ........................... 181/33 HD |
| 2,944,623 | 7/1960 | Bodine ........................... 181/33 HD |
| 2,983,478 | 5/1961 | Masheder .......................... 251/307 |
| 3,499,627 | 3/1970 | Horn.................................. 251/307 |
| 3,743,184 | 7/1973 | Mancus.......................... 239/265.19 |

Primary Examiner—Robert S. Ward, Jr.
Attorney, Agent, or Firm—L. Lee Humphries; Robert G. Upton

[57] ABSTRACT

This device is essentially a butterfly type valve which acts as a flow constriction by rotating a disc body with its planar axis parallel to or at right angles to fluid flow through a channel. The disc body has an additional capability of extending sectors from the body beyond the original boundary or peripheral edge of the body, thereby increasing the restriction of the flow area surrounding the disc.

2 Claims, 5 Drawing Figures

FLOW AREA MODULATOR AND FLOW DEFLECTOR

This invention herein described was made in the course of or under a contract or subcontract thereunder, (or grant) with the United States Air Force.

This is a division of application Ser. No. 395,807 filed Sept. 10, 1973, now abandoned.

BACKGROUND OF THE INVENTION

1. Field of the Invention

This invention relates to the control of flow through a conduit by the use of a butterfly type valve having extendible sectors that further increase the restriction of fluid flow through a conduit.

More particularly, this invention relates to a finite control of fluid flow through a body, such as a rocket motor case, wherein the butterfly type, flow constriction valve, having extendible sections therein, is positioned with its rotation axis in the plane of the throat of the nozzle of the thrust engine. Thrust vector control is possible in a plane that is perpendicular to the axis or hinge pin of the butterfly valve or disc.

2. Prior Art

There are many butterfly type valve devices in the prior art. One in particular, U.S. Pat. No. 1,706,020, describes a butterfly valve device positioned within a constricted area of a conduit. The butterfly valve allows maximum flow when the plane of the flow restrictor disc is parallel with the axis of a conduit, the butterfly providing a further restriction or stoppage of the flow by turning the plane of the disc in a direction which would be perpendicular to the axis of the conduit. However, if the butterfly disc device is smaller than the opening in the conduit so that when the butterfly is perpendicular to the axis of the conduit, flow is still able to pass around the peripheral edge of the disc, there is no additional flow control to monitor the amount of flow passing around the fixed, open disc. The present invention contemplates a butterfly type valve which has an outside peripheral dimension smaller than the inside diameter of the conduit in which the valve is positioned. When the valve is positioned in a plane perpendicular to the axis of the conduit, flow is able to pass around the peripheral edge of the valve. The present invention provides a finite control of the fluid passing around the disc by providing extendible segments in the disc, thus distinguishing over the prior art valve just described.

Another U.S. Pat. No. 2,724,405, discloses a pintle type of fixed obstruction positioned within a conduit. Around the peripheral edge of the pintle is an extendible, resilient section that can be expanded out into the area surrounding the outside peripheral edge of the pintle. The device can either shut off the flow entirely, or vary the flow past the lip of the resilient seal. The present invention has a much wider range of flow control since it is a non-fixed type of restriction, as opposed to a fixed pintle in a conduit. Additionally, the present invention has a capability of vectoring fluid flow out of a conduit which has obvious advantages in a rocket engine.

Yet another prior art U.S. Pat. No. 3,556,489, describes a pintle device positioned within a constricted throat of a conduit, the center portion of the pintle adjacent the narrowest throat region of the conduit being expandable so as to control the flow through the throat. This device, like the foregoing patent, controls flow uniformly through the constriction, thus providing a narrow range of flow control through the constriction. Again, the present invention has a much wider range of flow control in that the non-fixed butterfly valve may be positioned from a maximum flow to a minimum flow with additional precise control over the fluid passing by the extendible sectors in the disc.

SUMMARY OF THE INVENTION

The butterfly type valve, positioned disc of the present invention is primarily designed to provide several discrete ranges of flow area on command in a tube, conduit, or a throat region of a rocket engine, or the like. The flow area modulation concept is an extension of the discrete area blockage or flow constriction afforded by rotating a disc body (butterfly valve) with its planar axis or surface from parallel to right angles to the flow through a channel region, such as the throat of a rocket or ramjet engine. An extension of this capability is by the use of extendible sectors from within the positioned disc body. As the extendible sectors extend beyond the original boundary of the disc body, an increasing restriction of flow area occurs. The sectors may be driven in a single stroke to a fully extended position by hydraulic, pneumatic, or mechanical means, or they may be differentially extended or retracted to any intermediate position within the limits of their designed travel distance. For the variable position capability, a piston chamber arrangement is provided and hydraulic pressure fed to both sides of the piston controlling the position of the extendible element. Linear transducers attached to the extending bodies can be used for positional feedback of the fine control, as required. The disc may be rotated with the extendible sectors in the extended position, thereby eliminating the necessity to retract the sectors in returning to the original large flow area, i.e., the plane of the discs lying parallel with the axis of the conduit or rocket engine chamber.

A further aspect of the present invention is realized in that the positionable disc body may be used to provide directional control in one plane only of, for example, the exhaust products passing by the disc positioned within the throat region of a thrust engine such as a turbojet, rocket, or ramjet. Thrust vectoring is achieved by rotating the disc to angular positions between the planar and the 90° area, or between the full-open and the fully restricted positions of the disc. The extension of the extendible portions, while the disc is in other than the full-open position, serves to enhance the magnitude of thrust vector control that may be achieved by rotation of the basic disc. In other words, a very fine degree of thrust vectoring may be achieved by finite movement of one or both of the extendible sectors within the basic positioned disc body while it is positioned at an angle between the full-open and fully restricted positions.

It is, therefore, an object of this invention to provide a flow area modulation by utilizing a positionable disc body that has extendible portions that extend out from the peripheral edge of the disc to further restrict flow through a conduit.

More specifically, it is an object of this invention to provide a butterfly disc with extendible sectors that may be extended out of the peripheral edge of the disc, the positionable body being positioned within the throat region of a rocket or ramjet engine to provide thrust control through the throat region. The extendible sectors provide a finite degree of fluid flow restriction control through the restricted throat area.

An advantage over the prior art is the ability to provide very fine control of flow through a conduit by further restricting the flow past a butterfly type disc by extending or retracting disc portions that extend beyond the peripheral edge of the positioned body.

Yet another advantage over the prior art is the ability to provide thrust vector control by manipulating the disc within a conduit and by further manipulating the extendible portions that come out of the peripheral edge of the disc to provide fine thrust vector control in, for example, a rocket or ramjet engine.

DESCRIPTION OF THE PREFERRED EMBODIMENT

Figure 1:
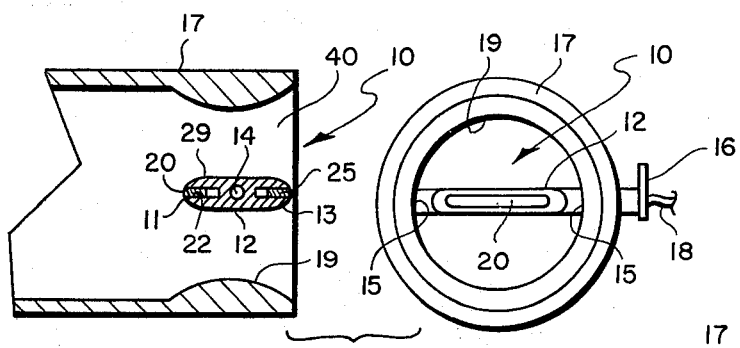
FIG. 1 is a sectional view and an end view of a positionable body, the plane of the disc lying parallel with the axis of the conduit, the extendible sectors being retracted.
Figure 2:
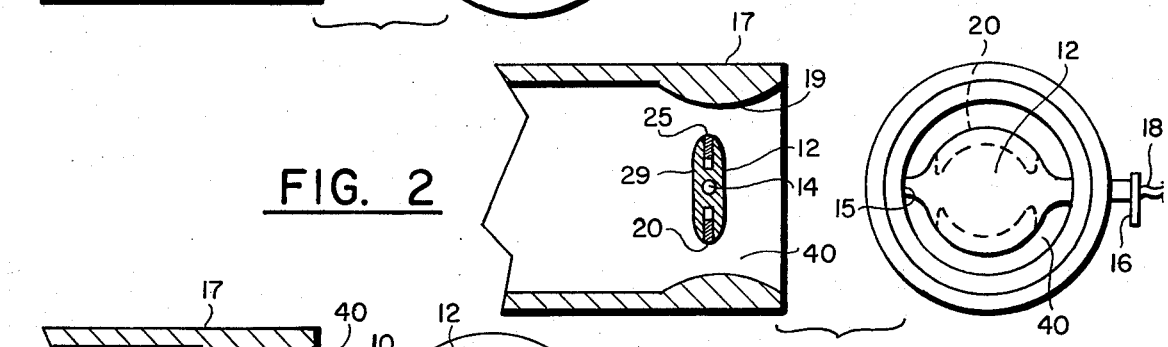
FIG. 2 is a cross sectional and an end view wherein the plane of the positionable body is lying perpendicular to the axis of the conduit, the extendible sectors being in the retracted position.
Figure 3:
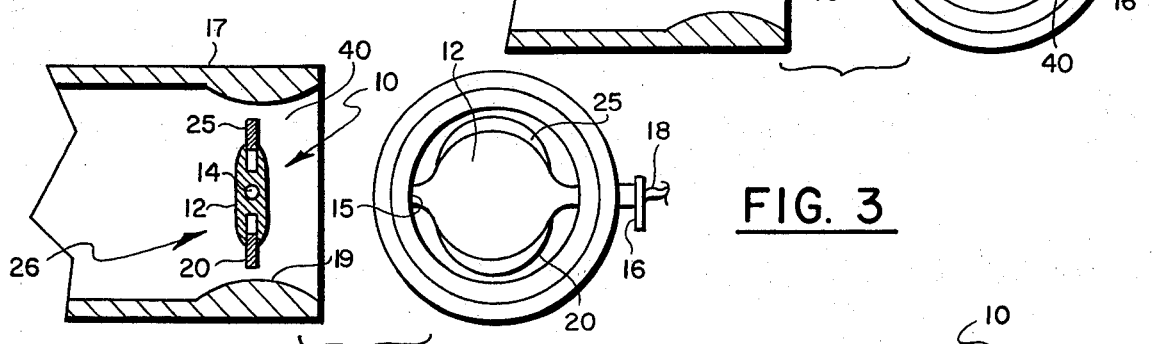
FIG. 3 is a cross sectional and end view of the disc with its planar surface lying perpendicular to the axis of the conduit, with the extendible sectors being in the extended position, thus providing maximum flow restriction through the conduit.

FIGS. 1, 2, and 3 depict the deflector-constrictor nozzle assembly of the positionable disc body generally designated as 10 in various configurations. FIG. 1 includes a housing 17 that could be, for example, the aft or nozzle end of a thrust type engine such as a rocket or ramjet. The deflector-constrictor nozzle assembly disc 10 consists of a disc housing 12 hinged on a pivot pin 14 anchored within supports 15 of nozzle housing 17. Hot combustion flow applications of the disc housing can be made, for example, from steel with silica/phenolic insulation or from a coated columbium assembly. One end of the pin 14 protrudes through the housing 17 and is affixed to an actuating lever 16. The disc actuating means is not shown. The disc housing 12 has a pair of retaining grooves or channels 22 positioned in peripheral edges 11 and 13. The grooves 22, along both edges 11 and 13, generally parallel the axis of the pivot pin 14. A pair or a multiplicity of extendible sector plates or wedges 20 and 25 are retained within retaining grooves 22 in the disc body 12. For high temperature applications, the sectors can be made, for example, from molded silica/phenolic, graphite, or refractory ceramic, or from a coated columbium metal. Sector actuating mechanisms 26 and 27 are positioned in the base of the retainers 22. A control means 18 to actuate actuators 26 and 27 is routed through pivot pin 14 to a control mechanism (not shown).

FIG. 1 shows the disc assembly 10 in position with its planar face 29 parallel with the axis of the solid rocket motor 17, thus offering the least amount of resistance (flow area constriction) to the gas flow passing out of the nozzle, through throat 19, the extendible sectors 20 and 25 being shown in a retracted position.

FIG. 2 shows the disc assembly 10 in position with its planar face 29 perpendicular to the axis of housing 17, thus preventing a greater resistance to the gas flow passing between the peripheral edge of the disc adjacent the throat 19, as indicated by numeral 40. The sectors 20 and 25 are again shown in the retracted position.

FIG. 3 shows the disc 10 in the same position as in FIG. 2, with the sectors 20 and 25 in their fully extended position, thus providing an even greater resistance (flow area constriction) to the gas flow passing throat 19, as indicated by the gap dimension 40.

Thus, it can be seen, with reference to FIGS. 1-3, that there is a variety of flow areas ranging from least resistance to fluid flow to a maximum resistance to fluid flow passing through the nozzle. The adaptation of the disc deflectors 20 and 25 enables a finite control of gases passing through the nozzle over a certain area range.

Figure 4:
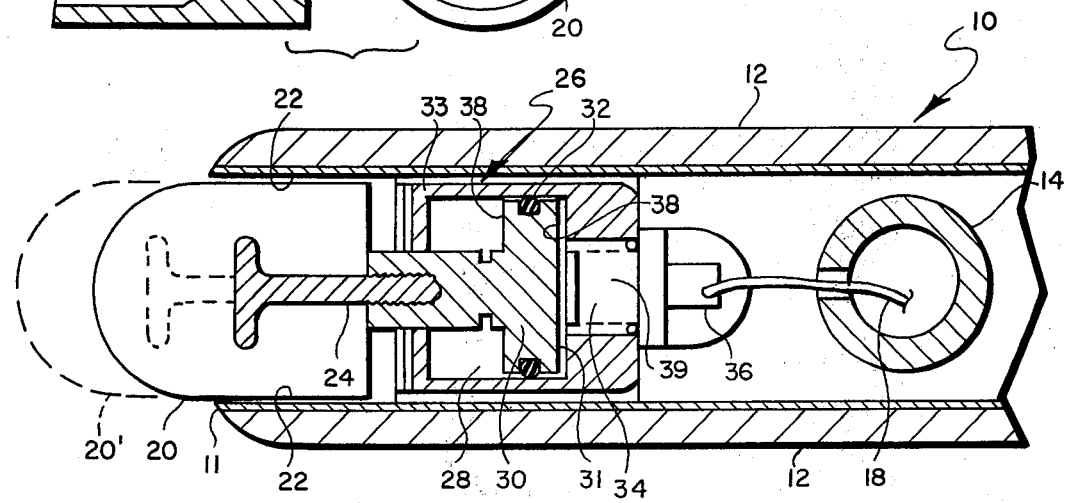
FIG. 4 is a partial cross sectional view of the positionable disc body illustrating a means to actuate the extendible sectors.

Turning now to FIG. 4, a preferred method to actuate the deflectors 20 and 25 is shown. As heretofore mentioned, the deflector 20 is slidable within a sector retaining wall or channel 22 in housing 12. The sector plate or wedge 20 is anchored to the actuator mechanism generally designated as 26 by retainer pin 24. The pin is secured to a piston 30 housed within piston housing 33. The deflector 20, in its retracted position within channel 22, positions the piston 30 against the inner wall 35 of housing 33. The chamber length 28, or distance between the upper surface 38 of piston 30, represents the distance the deflector 20 is permitted to extend beyond the peripheral edge 11 of disc housing 12. An O-ring seal 32 is provided in the wall of the piston. A deflector actuating force may be provided, for example, by a pyrotechnic explosive charge 36 actuated by actuator mechanism 18 which would be electric current carrying wires. A passageway 39 is provided in housing 33 for the actuating gases from the pyrotechnic charge 36 to impact upon face 31 of piston 30, thus driving deflector 20 into its fully extended position, as indicated at 25. A deflector spring 34 is placed within passageway 39 to urge the deflector 20 in the fully extended position after actuation.

Obviously, the sector actuating mechanism 26, described above, is one-way acting only. It would be obvious to select an hydraulic mechanism (not shown) to provide hydraulic fluid on both sides of piston 30. By utilizing conventional hydraulic flow control devices, the deflector 20 could be extended, retracted, or placed in any intermediate position.

Figure 5:
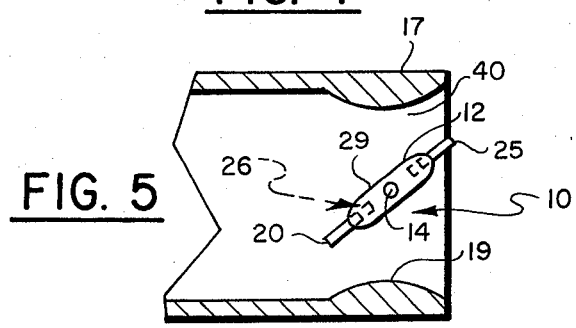
FIG. 5 is a cross-sectional view of a conduit with the planar surface of the positional disc body positioned between the axis of the conduit and a line perpendicular to the axis, thus providing a varying restriction through the conduit, the extendible sectors of the butterfly being shown in the extended position.

FIG. 5 indicates the disc assembly 10 with its planar surface askewed to the axis of the housing 17. With the disc shown in this position, it is obvious that thrust vector control passing through opening 40 between the deflectors 20 and 25 and throat 19 deflects the exiting exhaust products at an angle to the axis of housing 17, thus providing thrust vector control along a single plane. The amount of deflection of the exhaust products passing through the nozzle of the conduit or thrust engine chamber is infinitely variable within its designed area range by utilizing an actuating mechanism that will position the deflectors 20 and 25 in a controlled manner, dependent upon the desired amount of deflection required. Obviously, the deflectors 20 and 25 may be selectively manipulated to give a flow imbalance resulting in a small vector change in a single plane.

While a preferred embodiment is shown in the figures, it would be obvious to provide deflectors (sectors) in the peripheral edge of a butterfly type disc that will completely or selectively close off the opening defined by the edge of the disc and the housing.

It would additionally be obvious to provide other types of deflector (sector) actuating mechanisms than that shown and described.

It will, of course, be realized that various modifications can be made in the design and operation of the present invention without departing from the spirit thereof. Thus, while the principal, preferred construction, and mode of operation of the invention have been explained and what is now considered to represent its best embodiment has been illustrated and described, it should be understood that within the scope of the appended claims the invention may be practiced otherwise than as specifically illustrated and described.

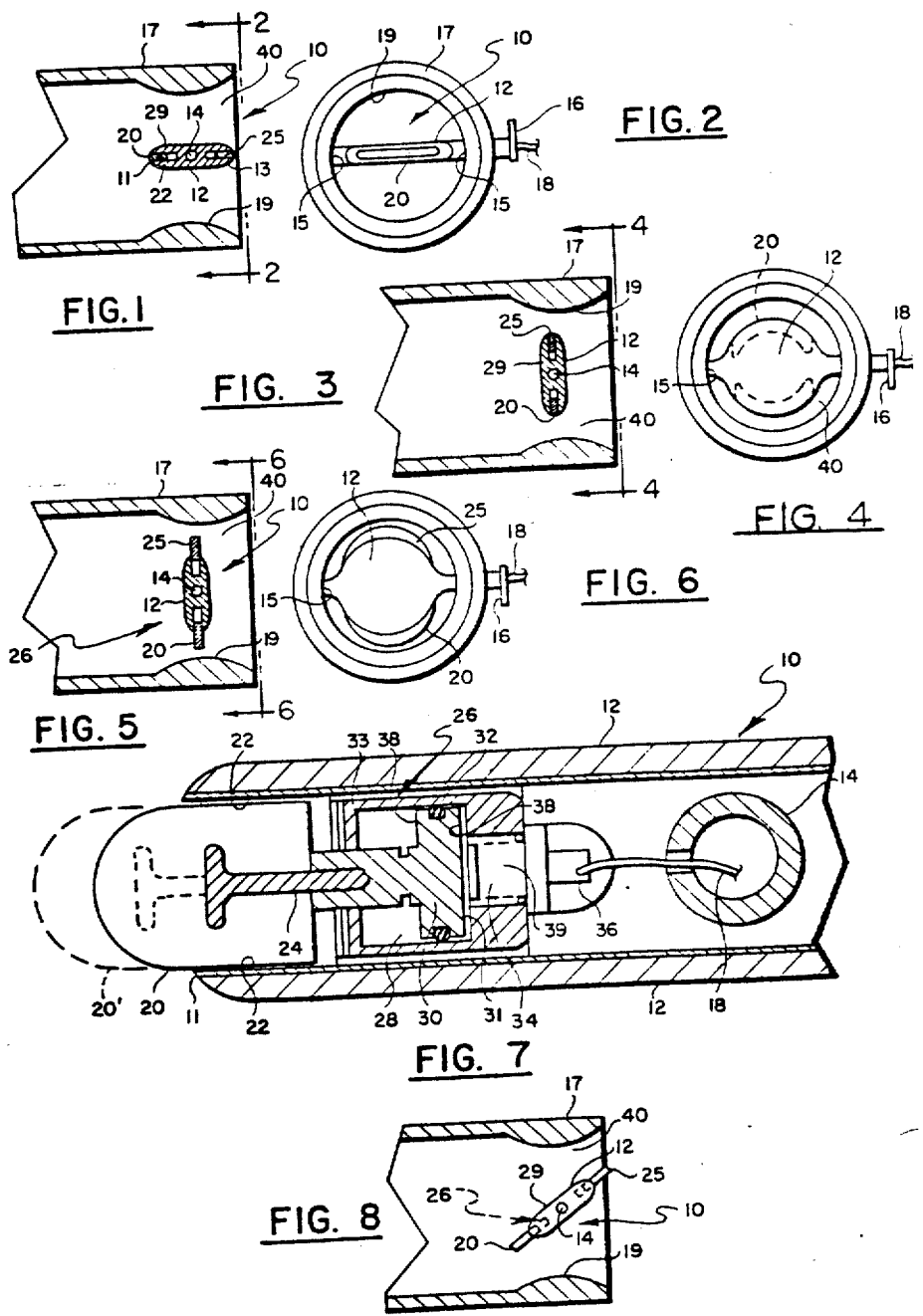

We claim:

1. A butterfly type flow area modulator and flow deflector for restriction and deflection of rocket engine exhaust products exiting a rocket engine nozzle comprising:
   a rocket engine nozzle body;
   a positionable disc body having a hinge pin therethrough so as to place said disc body perpendicular to the axis of said nozzle body, the boundary edge of said disc body being smaller than a throat region within said nozzle body so as to pass said exhaust products around said boundary edge of said disc, through said throat region when the planar surface of said positionable disc body is positioned substantially perpendicular to said axis of said nozzle;
   means to rotate said positionable disc body about said hinge pin to vary flow around said disc, through said throat region in said nozzle;
   said positionable disc body further having at least a pair of extendible portions within the boundary edge of said disc, said extendible portions, when extended, serving to further restrict said exhaust products exiting through said throat when said disc planar surface is positioned askew of said throat region in said nozzle by said means to rotate said disc body; and
   actuating means to extend or retract said extendible portions to provide a finite variable control of said rocket engine exhaust products passing around the peripheral edge of said disc, through said throat in said rocket engine nozzle body.

2. The invention as set forth in claim 1 wherein said positionable disc body and at least a pair of extendible portions therein are fabricated from a heat resistant, refractory type material, thereby minimizing erosion of said positionable body and extendible portions resultant from said exhaust products passing therearound.

* * * * *

UNITED STATES PATENT AND TRADEMARK OFFICE
CERTIFICATE OF CORRECTION

PATENT NO. : 3,970,253　　　　　　　　　　　　Page 1 of 2

DATED : July 20, 1976

INVENTOR(S) : William M. Burkes et al

It is certified that error appears in the above-identified patent and that said Letters Patent are hereby corrected as shown below:

Drawing should appear as shown on the attached sheet.
　　　Title page, below "Abstract", delete the number "5" and insert --8--.
　　　Column 3, line 17, delete words "and an end view";
Column 3, delete lines 21 through 29 and add the following paragraphs:
　　　--FIG. 2 is a view taken through lines 2-2 of FIG. 1;
　　　FIG. 3 is a cross-sectional view wherein the plane of the positionable body is lying perpendicular to the axis of the conduit, the extendible sectors being in the retracted position;
　　　FIG. 4 is a view taken through lines 4-4 of FIG. 3;
　　　FIG. 5 is a cross-sectional view of the disc with its planor surface lying perpendicular to the axis of the conduit with the extendible sectors being in the extended position, thus providing maximum flow restriction through the conduit;
　　　FIG. 6 is a view taken through lines 6-6 of FIG. 5;--
Column 3, line 30, delete the number "4" and insert --7--;
　　　line 33, delete the number "5" and insert --8--;
　　　line 43, delete the numbers "1, 2, and 3" and insert --1-6--.
Column 4, line 1, delete "FIG. 1" and insert --FIGS. 1 and 2--;
　　　line 7, delete "FIG. 2" and insert --FIGS. 3 and 4--;
　　　line 14, delete "FIG. 3" and insert --FIGS. 5 and 6--;
　　　line 19, delete the numbers "1-3" and insert --1-6--;
　　　line 26, delete the number "4" and insert --7--;
　　　line 57, delete the number "5" and insert --8--.

Signed and Sealed this

Twenty-first Day of February 1978

[SEAL]

Attest:

RUTH C. MASON　　　　　　　　　LUTRELLE F. PARKER
*Attesting Officer*　　　　　　*Acting Commissioner of Patents and Trademarks*